July 10, 1962
A. L. MENNESSON
3,043,362
APPARATUS FOR MACHINING A PIECE OF WORK
BY MEANS OF AN EROSIVE FLUID
Filed May 26, 1958
4 Sheets-Sheet 1
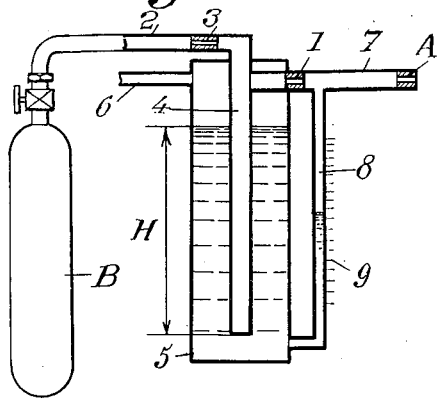
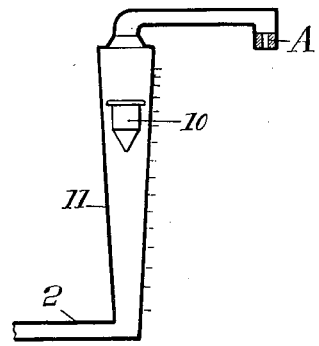
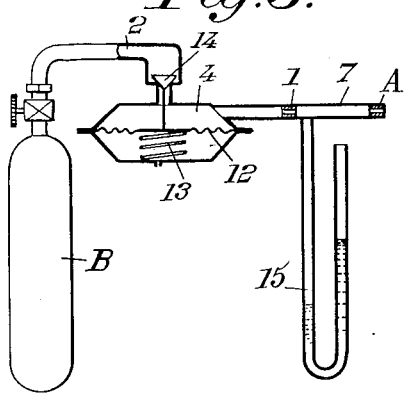
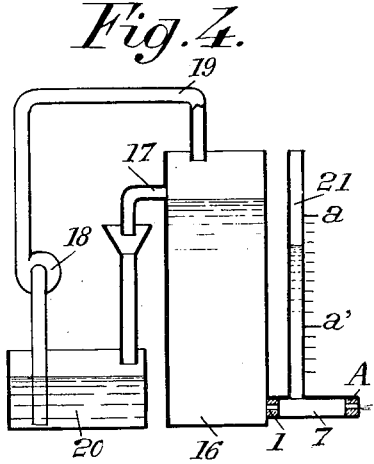
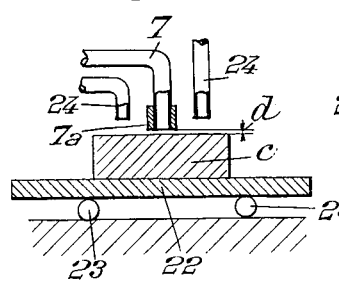
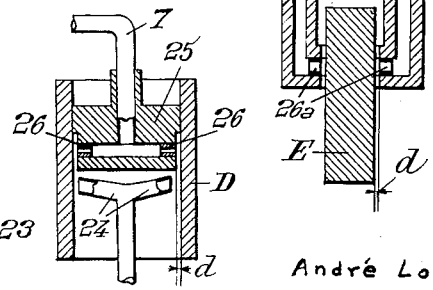
INVENTOR
André Louis Mennesson
BY
Bailey, Stephens + Huettig
ATTORNEYS

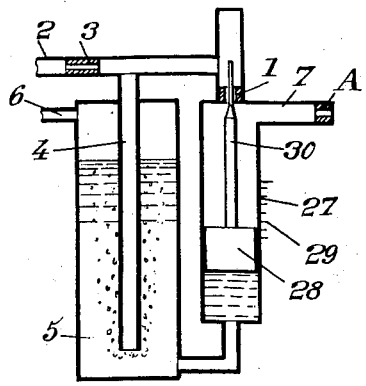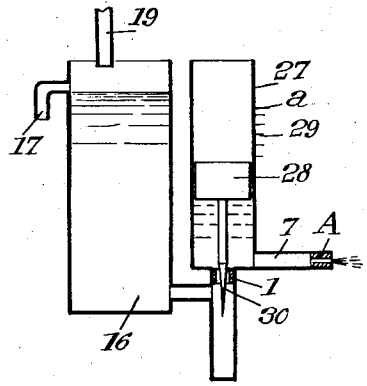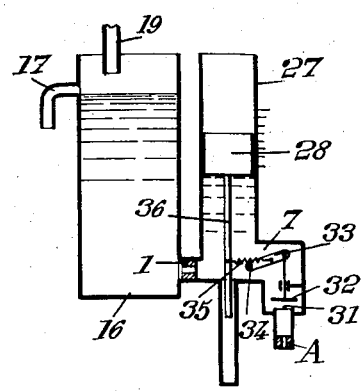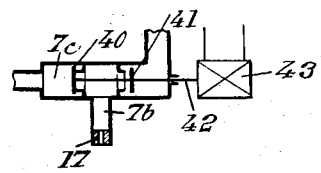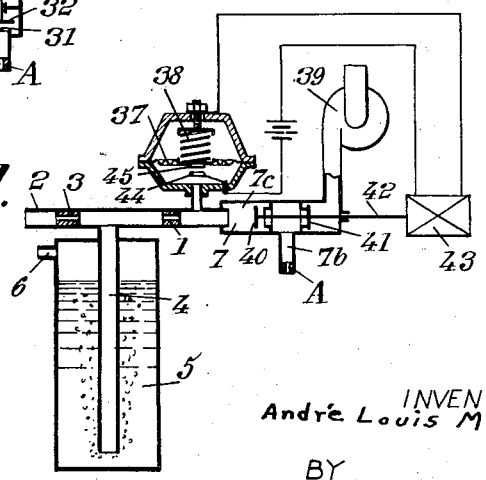

July 10, 1962  A. L. MENNESSON  3,043,362
APPARATUS FOR MACHINING A PIECE OF WORK
BY MEANS OF AN EROSIVE FLUID
Filed May 26, 1958  4 Sheets-Sheet 3
*Fig. 13.*
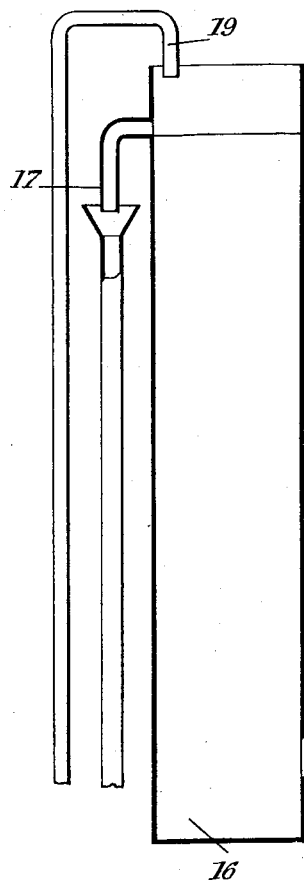
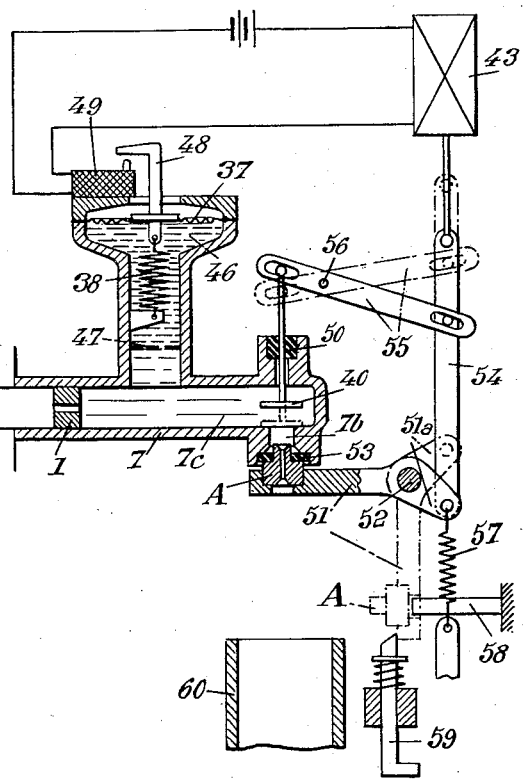
INVENTOR
André Louis Mennesson
BY
Bailey, Stephens & Huettig
ATTORNEYS 3,043,362
APPARATUS FOR MACHINING A PIECE OF WORK
BY MEANS OF AN EROSIVE FLUID
André Louis Mennesson, Neuilly-sur-Seine, France, assignor to Societe d'Applications et de Constructions pour Materiel Automobile (S.A.C.M.A.), Neuilly-sur-Seine, France, a society of France
Filed May 26, 1958, Ser. No. 737,841
10 Claims. (Cl. 156—345)

The present invention relates to methods and apparatus for machining a piece of work by means of an erosive fluid which removes matter from said piece until a given dimension thereof is reduced to a predetermined value.

In the present specification and claims, the term "erosive fluid" is used to designate both corrosive substances which chemically attack the piece of work and are in a liquid or gaseous form, such as acids (nitric, sulfuric, hydrofluoric, hydrochloric and similar acids) or mixtures thereof (aqua regia) and abrasive substances which mechanically attack the piece of work and may be in the form of particles (emery, sand, corundum, etc.) in suspension in a liquid or in a gas.

Chemical machining methods are already known which consist in attacking the piece to be machined by a chemical substance which gradually removes the matter thereof.

The object of the present invention is to provide a method and apparatus for machining a piece of work by means of an erosive fluid which is better adapted to meet the requirement of practice and in particular which permit of checking up at any time a dimension of said piece of work which is to be given a predetermined value by machining.

The invention consists in causing a stream of erosive fluid to flow continuously through a passage the cross sectional area of which is in relation to the above mentioned dimension of said piece, and measuring the instantaneous value of the flow rate of said fluid stream flowing through said passage so as to know the value of said cross sectional area and therefore of the dimension of said piece.

Preferred embodiments of the present invention will be hereinafter described with reference to the accompanying drawings, given merely by way of example and in which:

FIG. 1 is a diagrammatic sectional view of an apparatus made according to the invention and making use of an erosive fluid in gaseous form in order to machine an orifice in a piece of work.

FIG. 2 shows a modification of a portion of the apparatus of FIG. 1.

FIG. 3 shows another modification of the apparatus of FIG. 1.

FIG. 4 shows, similarly to FIG. 1, an apparatus making use of an erosive fluid in the liquid state.

FIGS. 5, 6 and 7 are partial views showing one of the apparatus of the preceding figures suitable for the machining of a flat surface, an inner bore and an external cylindrical surface, respectively.

FIGS. 8 and 9 show modifications of the apparatus of 1 and 4 respectively with the addition thereto of means for automatically reducing the flow rate of erosive fluid as the machining operation is proceeding.

FIG. 10 shows another modification of the apparatus of FIG. 4 including means for automatically stopping the flow of the erosive fluid at the end of the machining operation.

FIG. 11 shows another modification of the apparatus of FIG. 1, analogous to that of FIG. 10, but further including means for circulating a washing fluid constituted by air.

FIG. 12 shows a portion of the apparatus of FIG. 11 in another position of operation.

FIG. 13 shows an apparatus analogous to that of FIG. 4 further including a device for automatically ejecting the machined pieces.

Figure 14:
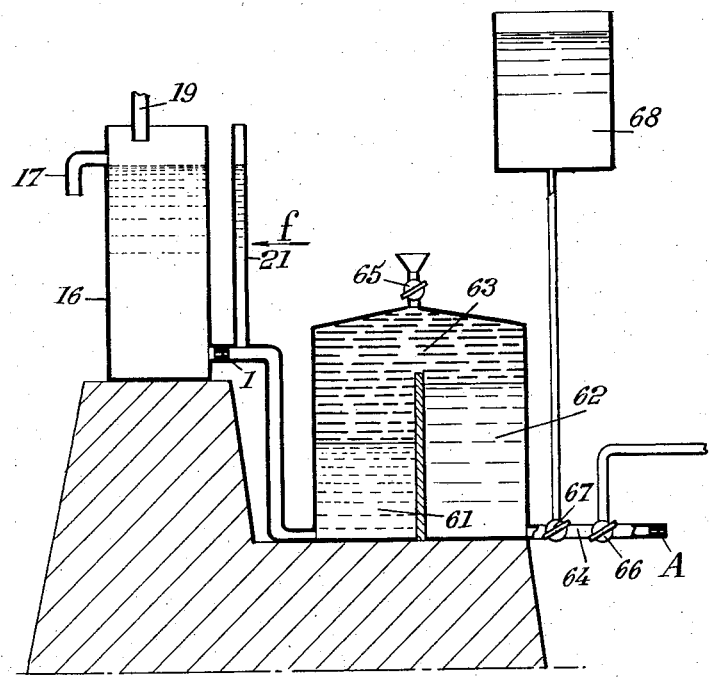
FIG. 14 shows still another modification of the apparatus of FIG. 4 arranged to protect the measurement device against direct contact with a corrosive fluid that is used.

In order to machine a piece of work so as to give a predetermined value to one dimension thereof, use is made, according to the present invention, of an apparatus which comprises means forming a passage the cross sectional area of which is in relation to the dimension of said piece, said means including the portion of said piece from which matter is to be removed to perform the desired machining, a source of erosive fluid at a pressure higher than that existing on one side of said passage, a conduit extending between said source and the other side of said passage and the means for measuring any time the value of a factor in direct relation to the instantaneous value, at the same time, of the flow rate of the fluid from said source flowing through said passage; preferably said factor is the value of the pressure of said fluid in the conduit immediately upstream of said passage.

In the embodiment of FIGS. 1 to 4, said passage constitutes the orifice of the piece of work A which has been initially given a dimension (diameter) slightly smaller than that to be obtained by machining.

In what follows, it will be supposed that the above cited fluid is a corrosive fluid which exerts a chemical action on the piece of work.

In the construction of FIG. 1, this corrosive fluid is a gas.

The corrosive fluid fed under pressure through conduit 2 and coming from a gas bottle B preferably flows through a calibrated orifice 3 for the expansion of the gas and intended to avoid too great an inflow of gas to the apparatus. Conduit 2 opens into a tube 4 which dips in a vessel 5 filled with a liquid. The top of vessel 5 is in communication with the atmosphere or any equivalent space through a tube 6. If the normal level of the liquid is as indicated on the drawing and if the lower end of tube 4 is immersed at a distance H below the level of the liquid, when the flow rate of gas through orifice 3 is sufficient to cause an excess thereof to escape from the bottom of tube 4, the pressure inside said tube 4 is equal to the manometric height H of the liquid. This arrangement therefore constitutes a particularly simple device for creating a constant pressure upstream of orifice 1.

The fluid flowing through orifice 1 also flows subsequently through the orifice of piece A the dimension (diameter) of which is to be brought to a predetermined value. Between orifice 1 and that of piece A there is provided a chamber 7 and a manometric device measuring the pressure existing in chamber 7 indicates the flow rate of fluid through the orifice of piece A. In order to perform the manometric measurement, it suffices to connect chamber 7 through a vertical tube 8 with the lower end of vessel 5. This tube 8 thus constitutes a pressure-gauge the indicator column of which is made of the same liquid as that present in vessel 5. The value of the pressure in chamber 7 is indicated by the height of liquid in tube 8, said height being read on a scale 9.

The operation of this apparatus is as follows:

As the corrosive gas is flowing through the orifice of piece A, there is produced a chemical attack which progressively increases the diameter of said orifice. As a consequence of this, the flow rate of fluid through this orifice increases and the pressure in chamber 7 upstream of calibrated orifice 1 decreases. The level of the liquid in the pressure gauge rises and the operator can stop the operation, for instance by removing piece A, as soon as the level of the liquid in tube 8 has reached a predetermined value indicated on scale 9. Thus, no pieces are wasted during the manufacture of said pieces A since it is possible to give the diameter of the orifice of any piece A the desired dimension.

In the modification of FIG. 2, the corrosive fluid (which may be either a gas or a liquid), coming from a conduit 2, is caused to flow through a flow-meter of the kind including a float 10 of a very light weight movable in a vertical tube 11 which flares up in the upward direction. It is known that the flow rate of the fluid flowing through the vertical tube in these conditions is indicated by the position of the float in the tube. Therefore, as the matter of piece A is being chemically attacked by the corrosive fluid, the float rises gradually in glass tube 11. The operator can stop the operation as soon as the desired dimension has been obtained for the diameter of the orifice machined in piece A.

FIG. 3 shows a modification of the construction of FIG. 1 in which the constant pressure supplied upstream of calibrated orifice 1 is obtained by a pressure relief device. This device is constituted in a conventional manner by a deformable diaphragm 12 subjected to the action of a spring 13 and operating a valve 14 which controls the inflow of gas under pressure. That of the two chambers limited by the diaphragm 12 which is located on the side of valve 14 constitutes the constant pressure chamber 4 from which calibrated orifice 1 is fed with fluid. The chamber 7 existing between calibrated orifice 1 and piece A communicates with a pressure gauge device constituted for instance by a U-tube 15. The operation is the same as in the two preceding cases.

FIG. 4 shows an apparatus making use of a liquid as corrosive fluid. The use of a gas may, in some cases, involve some difficulties. As a rule, the chemical attack obtained by gases is slower than that obtained by liquids. On the other hand, most of the products used for effecting a chemical attack and most of the products of reaction are toxical. It is therefore necessary to be able to collect them easily and this operation is easier in the case of a liquid than in that of a gas. However, the principle remains the same. In order to feed liquid at constant pressure to orifice 1, use is made of a vessel 16 provided with an overflow 17. This vessel 16 is constantly fed with corrosive liquid, for instance by a pump 18 which discharges the liquid through a tube 19. The excess of liquid flowing out at 17 passes into a tank 20 from which this liquid is again collected by pump 18 and so on.

Chamber 7 located between calibrated orifice 1 and piece A and in which the pressure indicates the flow rate through the orifice provided in piece A is connected to a tube 21 acting as a pressure gauge.

The operation is the same as in the embodiment above described. Piece A, the initial inner diameter of which, obtained by conventional machining, is slightly above the desired dimension, is mounted on the apparatus of FIG. 4 and the top of the liquid column in tube 21 is at a level such as $a$. Previously to this operation, a standard piece analogous to A but the orifice of which has exactly the desired dimension to be obtained had been mounted at the end of chamber 7 so that the manometric height to be obtained in tube 21 had been marked at $a'$. When piece A is in the position shown by FIG. 4, it suffices to wait while the liquid is flowing through orifice 1 and orifice of piece A, while observing the manometric column of liquid which gradually flows down from $a$ toward $a'$, since orifice 1 is made of the material which is not attacked by the liquid circulating through the apparatus, whereas piece A is attacked by said liquid. As soon as the level of the liquid comes at $a'$, the operator stops the machining operation, withdraws piece A and neutralizes the effects of the corrosive liquid which may still be adherent to said piece. Piece A has the desired dimension.

The preceding examples relate to the determination of the flow rate through an orifice provided in a piece of work. But other operations may be effected according to the present invention.

By way of example, FIG. 5 illustrates the possibility of effecting a machining operation which would practically correspond to a rectifying or facing operation. Any of the apparatus above described may be used for this purpose with the difference that the end of chamber 7 is not engaged on a piece such as A.

Let it be supposed that C is the piece of the faces of which, for instance the upper face, is to be machined. Piece C is placed on a table 22 and opposite its upper face is mounted the end of chamber 7. This end is made of a material which is not attacked by the corrosive fluid and is for instance provided with a kind of nozzle 7a also made of a material which is not attacked by said fluid, whereas piece C is attacked by the fluid. According to this arrangement, the passage corresponding to the orifice provided in the piece A of the preceding examples is constituted by the annular space limited between nozzle 7a and the piece C and the height of which is the distance $d$ from the end of said nozzle to the upper face of piece C. Therefore a standard piece is first placed on table 22 so as to determine the pressure or manometric height to be obtained at the end of the machining operation in chamber 7. Then this standard piece is replaced by piece C which is to be machined and which is of course of greater height than said standard piece so that the distance $d$ is smaller in the case of piece C than in the case of the standard piece. The corrosive fluid is then made to circulate and, at the beginning of the operation, the manometric height is too great. As the surface is being attacked, distance $d$ increases and the manometric height decreases until it reaches the value indicated by the preliminary test effected with the standard piece. The operation can then be stopped, but preferably piece C is displaced so as to effect a similar machining operation on the portion of piece C adjoining that which has just been treated. It suffices for this purpose to make table 22 movable, which has been diagrammatically indicated by rollers 23. It should be noted that, in order to avoid the attack by the corrosive fluid of the portions of piece C adjoining that located opposite the outlet of chamber 7, it is of interest to dilute very quickly the corrosive fluid issuing from said chamber 7 and circulating over portions of piece C other than that located just opposite the outlet of chamber 7. This diluting may be effected by a neutral fluid such as water or air which is for instance projected through pipes such as 24. The portions of piece C which are to be protected against the attack by the corrosive fluid may also be coated with a substance which is not attacked by said fluid such as a varnish, a paint and so on.

FIG. 6 shows a device used for the finishing of a cylindrical bore.

The piece of work is constituted by a piece of work D the inner diameter of which is to be given a predetermined value. For this purpose, the corrosive fluid is fed through a hollow member 25 to the center of which said corrosive fluid is fed from chamber 7, this fluid flowing out from the external wall of member 25 through orifices such as 26. These orifices are located at a distance $d$ from the inner wall of the bore of cylinder D, which distance is to be increased by the action of the corrosive fluid on the matter of cylinder D. The operation is effected in the same manner as in the case of FIG. 5 and in this case also conduits such as 24 are provided to feed a neutral fluid in order to dilute very quickly the corrosive fluid which otherwise might attack portions of the surface of the inner wall of the cylinder which are not located opposite orifices 26.

Concerning this arrangement, it should be remembered that in well determined conditions, it is possible to obtain a balance of the flow rates through orifices such as 26 even if member 25 is not perfectly centered with respect to cylinder D.

FIG. 7 illustrates the finishing of the outer surface of cylinder E. In this case also, the corrosive fluid is fed from a chamber 7 to a hollow member 25a provided with orifices 26a which open on the outside of, and very close to, the external surface of cylinder E. The distance d between these orifices 26a and cylinder E influences the flow rate through orifices 26a and permits, as in cases illustrated by FIGS. 5 and 6, of measuring with reference to a standard piece the dimension of cylinder E opposite orifices 26a. In both of the arrangements illustrated by FIGS. 6 and 7, it may be advantageous to displace the piece of work or to pivot it about its axis in such manner as to obtain a regular attack of the piece over the whole desired area. Also all the portions of the piece which are not to be attacked by the corrosive fluid may be protected by a suitable coating.

FIGS. 8 and 9 show improved apparatus making it possible to work successively with two different sensitivities that is to say to perform operations corresponding to a rough machining and to a finishing respectively.

The apparatus of FIG. 8 is of the same general arrangement as that of FIG. 1, including conduit 2 for feeding the gas under pressure, calibrated orifice 3 intended to prevent the feed of gas under too high pressures, tube 4 in which the pressure is constant, said tube being immersed in a vessel 5 filled with liquid. Orifice 1 is interposed between tube 4 and end chamber 7 at the end of which is disposed the piece A the orifice of which is to be machined.

In this case, the manometric device is no longer constituted by a mere glass tube but by a tube 27, preferably of greater cross section, in which is mounted a float 28 and this tube 27 may be provided with an external scale 29. Float 28 carries a kind of needle 30, for instance vertical, adapted to pass through orifice 1. This needle may have portions of different diameters decreasing from the bottom toward the top. Advantageously, as shown, it includes a portion of conical shape.

This arrangement permits of obtaining the following advantages.

At the beginning of the operation, when piece A is first being machined, it is possible to obtain, owing to the great cross sectional area of orifice 1, a very high flow rate of gas, which permits a quick increase of the diameter of the orifice provided in piece A. This increase might be too quick to permit of obtaining the desired accuracy of machining but when the manometric height in tube 27 has decreased to a predetermined value, a larger portion of needle 30 penetrates into calibrated orifice 1 so as to reduce the cross sectional area thereof and therefore the flow rate of corrosive gas which masses through piece A. The machining operation is then slowed down.

FIG. 8 shows an apparatus making use of a gaseous fluid. FIG. 9 shows a similar apparatus making use of a liquid fluid. In this case, the manometric column mounted on chamber 7 is constituted, not by a mere tube, but by a chamber 27 of larger diameter containing a float 28 the lower end of which is provided with a needle 30 of suitable axis section, for instance of conical shape, engaged in calibrated orifice 1.

At the beginning of the operation, when the diameter of the passage extending through piece A is small, float 28 is at a relatively high level, for instance opposite the graduation a corresponding to the maximum flow through orifice 1. As the orifice of piece A increases owing to the chemical attack, float 28 moves down and causes orifice 1 to be more and more throttled by needle 30, thus reducing the flow rate of liquid flowing through orifice A. The machining operation is thus more and more slowed down.

The figures which will be now referred to illustrate industrial applications of the principle above described.

Up to now, it has been supposed that, when piece A (or C, D, E) has reached the desired final dimension, the machining operation is stopped in any suitable manner. Means for automatically controlling at least some of these operations will be now described.

First of all, when piece A is removed from the apparatus, means must be provided to prevent the corrosive fluid from flowing out because in addition to the fact that the flow rate of this liquid then becomes important and that the loss of fluid may be far from negligible, this fluid is generally of a toxical nature and might injure the operator.

FIG. 10 shows automatic means for complying with this requirement. These means are mounted in combination with an apparatus making use of a corrosive liquid analogous to that of FIG. 9. But such means might be combined with an apparatus making use of a corrosive gas and in particular of the type shown by FIG. 8.

The difference between the apparatus of FIG. 10 and that of FIG. 9 is that the float 28 does not carry a rod provided with a conical portion 30 engaged in orifice 1. In the construction of FIG. 10 orifice 1 remains of constant cross sectional area.

In chamber 7, there is provided, at a slight distance from piece A, upstream thereof, a valve seat 31 cooperating with a valve 32 which is kept open by a lever 33 pivoted at 34 and subjected to the action of a spring 35, said spring being fixed at the other end to a rod 36 carried by float 28.

When the machining operation is finished and the operator removes piece A, the flow rate through chamber 7 is then considerable and accordingly the pressure in said chamber drops, so that float 28 moves down very quickly and drives in the downward direction the end of spring 35 fixed to rod 36 and when said spring end occupies a sufficiently low position it produces the immediate closing of valve 32.

As a matter of fact, a simple improvement consists in initially adjusting the apparatus in such manner that the downward movement of float 28 causes the closing of valve 32 just when the manometric height corresponds to the dimension to be obtained for the orifice of piece A, said piece being removed only after this automatic operation.

However, there is still a difficulty due to the fact that in this case a slight amount of residual liquid or gas remains between the seat of valve 31 and piece A, so that the attack reaction may go on and finally piece A may have a dimension which is not exactly the desired one.

FIG. 11 shows an embodiment of the invention which eliminates this drawback. The apparatus of FIG. 11 has been shown as making use of a gaseous fluid but it might easily be transformed so as to make use of a liquid fluid.

In this construction, the pressure existing in chamber 7 is used to act not upon the liquid of a conventional pressure gauge (as in the case of FIG. 1) but upon a manometric device constituted by a flexible diaphragm 37 subjected to the pressure existing at 7 and to the action of an adjustable spring 38 which opposes the effect of said pressure.

This manometric device controls a three-way valve system capable, when the pressure in chamber 7 drops below a predetermined value, of dividing chamber 7 into two compartments, to wit an upstream compartment 7c and a downstream compartment 7b, while simultaneously connecting the downstream compartment 7b with a source of neutral fluid under pressure constituted in this case by a pump 39. Advantageously, an electromagnetic relay is interposed between the manometric device and the three-way valve system.

In the construction shown by FIG. 11, the three-way valve system is constituted by two valves 40 and 41 carried by the same rod 42 and the electro-magnetic relay consists of an electro-magnet 43 in the excitation circuit of which is inserted a switch operated by diaphragm 37. This switch includes a fixed contact 44 and a movable contact 45 carried by diaphragm 37, rod 42 being rigid with the movable element of electro-magnet 43.

As long as the machining operation is taking place, the elements are in the respective positions shown by FIG. 11. Valve 40 is open and it is arranged in such manner that the flow of the gaseous stream around this valve does not create any substantial pressure drop as compared with that created by orifice 1 and by the orifice of piece A. At the same time, valve 41 is kept closed so that chamber 7 is not in communication with the source 39 of neutral fluid. As the orifice of piece A increases due to the chemical attack thereof, the pressure at 7 decreases and spring 38 finally becomes capable of overcoming the action of this pressure so that when the diameter of the passage through piece A has reached the predetermined value, contacts 44 and 45 cooperate together. Electro-magnet 43 is then excited and drives valves 40 and 41 into the position shown by FIG. 12. Valve 40 then cuts off the inflow of corrosive gas toward piece A while valve 41 opens the communication between the source of neutral fluid 39 and chamber 7b.

In view of the fact that said chamber 7b, limited by valves 40 and 41 and piece A, can be made very small, a flow of neutral fluid can immediately expel the corrosive fluid therefrom and the attack reaction is instantaneously stopped.

Thus the operator can remove piece A from the appartus a substantial time after the displacement of valves 40 and 41 without any risk of the chemical action of the fluid still taking place upon the piece.

FIG. 13 shows still another modification of the apparatus according to this invention which, in addition to automatically stopping the feed of corrosive fluid, automatically removes the piece to be machined from the apparatus.

In this particular case, it has been supposed that the piece to be machined is a piece A provided with a small cylindrical orifice the diameter of which must be given a given value.

It is supposed in this case that the corrosive fluid is a liquid and that it is fed through means such as above described with reference for instance to FIG. 4.

Chamber 7 is provided with a manometric device constituted by a diaphragm 37 pulled downwardly by a spring 38 against the action of the pressure existing in chamber 7.

It should be noted that it is often easier to make diaphragm 37 and spring 38 of a material which is attacked by the corrosive liquid used in the apparatus.

In this case, as shown by the drawing, the above mentioned elements are in contact with a liquid serving to transmit the hydrostatic thrust but which does not mix with the corrosive liquid and is not attacked by it. In particular, if the corrosive liquid is one of the acids above mentioned, it is possible to utilize as neutral liquid a silicon oil the density of which is slightly lower than that of said acids and which consequently remains at the upper portion of the chambers in which it is placed.

In FIG. 13, the spring and the diaphragm are in contact with the liquid 46, for instance such as silicon oil, a dotted line 47 indicating the surface of separation between said liquid 46 and the corrosive liquid flowing through chamber 7.

It can be seen that despite the possible displacement of diaphragm 37, the corrosive liquid can never come into contact with spring 38 or diaphragm 37.

Diaphragm 37 carries a finger 48 adapted to cooperate with a micro-contact 49 mounted to control electro-magnet 43.

Finally, chamber 7b, which adjoins piece A, is controlled by valve 40 the stem of which extends to the outside of the apparatus through a stuffing-box 50.

Piece A is fitted in a housing provided in an arm 51 pivoted about an axis 52. A packing joint 53 carried by the apparatus ensures a fluid tight contact between piece A and the casing of chamber 7, thus compelling the whole of the corrosive fluid that flows through said chamber to pass through the orifice of piece A.

Part 51 constitutes one of the arms of a lever the other arm 51a which is operatively connected with a rod 54 operated by electro-magnet 43. Furthermore a lever 55 pivoted at 56 is also connected at one end to said rod 54 and at the other end to the stem of valve 40. A spring 57 urges valve 54 downwardly so as to keep piece A applied against packing joint 53 while holding valve 40 in the open position. A substantially horizontal finger 58 and a spring locking device 59 are provided, and their function will be explained hereinafter. A container 60 located below piece A when it is in its normal position is intended to receive the liquid escaping from the apparatus.

At the beginning of the operation, the elements are in the position indicated in solid lines on FIG. 13. But when the diameter of the orifice in piece A becomes sufficiently great, the pressure in chamber 7 is so reduced that spring 38 causes finger 48 to cooperate with micro-contact 49, thus closing the electric circuit of electro-magnet 43, which pulls rod 54 upwardly (position shown in dotted lines). This movement causes valve 40 to be closed and thus to prevent any outflow of liquid toward the outside of the apparatus. Simultaneously, arm 51 is moved from the position in solid lines to that shown in dotted lines. This arm 51 carries piece A together with it and at the end of the displacement of arm 51, said piece A strikes finger 58 whch drives it out from its housing so that said piece drops into a suitably located container. Advantageously, this container is filled with a neutralizing liquid which immediately stops any chemical action which could modify the dimension of the orifice machined in piece A, as soon as the piece has left the apparatus. The operator then fixes a new piece in the housing of arm 51 which had remained in the position shown in dotted lines owing to the action of locking device 59. The operator then releases this locking device so that new piece A is applied against packing joint 53, while valve 40 is opened and permits a new machining operation to start. Locking device 59 is necessary because, as soon as electro-magnet 43 has caused valve 40 to be closed, the pressure in chamber 7 builds up to a value such that contact 48 is moved away from micro-contact 49, which would tend to return arm 51 into its horizontal position. Of course, this operation must take place only after a new piece A has been fitted in said arm 51.

Container 60, located along the axis of piece A in machining position serves to collect the liquid which escapes through the orifice of this piece. This liquid must be very carefully recovered because it is generally necessary to regenerate it, since it constitutes a product of the reaction between the corrosive liquid itself and the matter of the piece attacked by said liquid.

FIG. 14 shows an arrangement which permits of simplifying the measurement apparatus.

As a matter of fact, in chemical machining apparatus the fluids that are used are generally very corrosive and therefore make it necessary to make the measurement apparatus with materials which are capable of resisting in a permanent fashion the action of these fluids. These materials are often difficult to establish or, if they exist, they may be very expensive or difficult to prepare and in particular to mold or to machine.

This difficulty may be avoided if the measurement apparatus is arranged in such manner as to work with a fluid which is not corrosive whereas the corrosive fluid is used to attack the piece to be machined. For this purpose, it suffices to interpose, between the corrosive fluid and the fluid which flows through the measurement apparatus, a third fluid which is not attacked by either of the two first mentioned ones and which is arranged so that it does not mix with either of them.

On FIG. 14, it has been supposed that it is desired to machine the orifice of a piece A of a metal, for instance consisting chiefly of copper, by the action thereon of a corrosive liquid such as nitric acid.

In order to prevent the action of nitric acid on the measurement means, the whole of the apparatus is made as follows:

The measurement means proper include a vessel 16 and an orifice 1 having a constant cross sectional area downstream of which is provided a tube 21 for measuring the manometric height of the fluid flowing downstream of orifice 1. The downstream side of orifice 1 communicates with the lower portion of a chamber 61 adjacent to a chamber 62, which two chambers communicate together by their common upper part 63.

The lower part of chamber 62 communicates with a tube 64 at the end of which is mounted a piece A to be chemically attacked.

Vessel 16 and chamber 61 are filled with a neutral liquid such as water and chamber 62 with the corrosive liquid.

At the upper part 63 of these two chambers 61 and 62, there is provided an intermediate liquid which is not attacked by the corrosive liquid (nitric acid) and does not mix therewith, generally owing to the difference of density, whereas this intermediate liquid is not attacked by the neutral liquid (water) and does not mix therewith.

Among the systems which may comply with these conditions for constituting the intermediate liquid, may be mentioned silicon oils the density of which is lower than that of water and that of nitric acid, whereby said oils are constantly maintained at the upper part 63 of the above mentioned chambers. A valve 65 permits of expelling air or gases accumulated at the top of part 63 because in order to effect an accurate measurement of the fluid flow rate, it is necessary to avoid the presence of a compressible fluid between the measurement appaartus and the orifice of piece A.

A three-way cock 66 permits of cutting off the feed of corrosive liquid to tube 64 and to feed water into said tube in order to neutralize the action of the corrosive liquid as soon as piece A has reached the desired dimension.

A valve 67 makes it possible to connect chamber 62 with a corrosive liquid reservoir 68.

At the beginning of a machining operation, the apparatus is in the state shown by FIG. 14. Chamber 61 contains a certain amount of water and an important amount of intermediate liquid, whereas chamber 62 contains an important amount of corrosive liquid and a small amount of intermediate liquid.

Chamber 62 having been filled with corrosive liquid from reservoir 68, said reservoir 68 is cut off from the remainder of the apparatus by means of valve 67. Valve 66 is placed in the position where it prevents the inflow of water.

The corrosive fluid may then be passed through the orifice of piece A and of course the level separating the two liquids contained in chamber 62 moves down at the same time as the level separating the two liquids contained in chamber 61 moves up correspondingly.

This displacement permits of measuring the flow rate of fluid passing through the orifice of piece A, which flow rate is obviously the same as that of the liquid passing through the orifice 1.

This flow rate may be measured either directly, or by manometric means, by reading the level marked on vertical tube 21 and it has been determined in advance that the dimension of the orifice of piece A will be correct when the level in tube 21 drops to the place indicated by an arrow $f$.

The operation is then stopped, by opening valve 66 which cuts off the piece A from the corrosive liquid and sends water onto said piece in order to stop any chemical action that could still go on.

The level of separation between the two liquids would not permit of effecting several operations analogous to the preceding one if precaution were not taken to restore this level to the upper part of chamber 62.

This can be effected by means of tank 68, which, after opening of valve 67, restores the level in chamber 62 and also in chamber 61 so that the parts are again in the position illustrated by FIG. 14.

In a general manner, while I have, in the above description, disclosed what I deem to be a practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. An apparatus for machining a surface of a piece of work to remove matter from said surface, which apparatus comprises, in combination, a source of erosive fluid under pressure, said fluid being capable of attacking the matter of said piece of work, conduit means starting from said source and leading to the surface of said piece from which matter is to be removed, said conduit means being adapted to produce a continuous stream of said erosive fluid and having an opening closely adjacent said surface so as to form therewith; a confining passage of small cross section at least a portion of which is constituted by said surface, said passage leading to the open atmosphere, and means for measuring at any time the value of the flow rate of said stream of fluid flowing through said passage to determine when a sufficient amount of matter has been removed from said surface.

2. An apparatus for machining a surface of a piece of work to remove matter from said surface, which apparatus comprises, in combination, a source of erosive fluid under pressure, said fluid being capable of attacking the matter of said piece of work, conduit means starting from said source and leading to the surface of said piece from which matter is to be removed, said conduit means being adapted to produce a continuous stream of said erosive fluid and having an opening closely adjacent said surface so as to form therewith; a confining passage of small cross section at least a portion of which is constituted by said surface, said passage leading to the open atmosphere, a partition in said conduit provided with a calibrated orifice, and manometric means for measuring the pressure existing in the portion of said conduit located between said partition and said passage to determine when a sufficient amount of matter has been removed from said surface.

3. An apparatus according to claim 2 further including means for reducing the flow rate of erosive fluid through said passage in response to the increase of the dimension of said passage.

4. An apparatus according to claim 2 further including means operatively connected with said manometric means for reducing the cross sectional area of said orifice in response to a decrease of the pressure existing in said portion of said conduit.

5. An apparatus according to claim 2 further including means operatively connected with said manometric means for automatically stopping the flow of said erosive fluid through said pasage in response to a reduction of the pressure in said portion of said conduit to a predetermined value.

6. An apparatus according to claim 2 further including means operatively connected with said manometric means for automatically stopping the flow of said erosive fluid through said passage in response to a reduction of the pressure in said portion of said conduit to a predetermined value and means operatively connected with said last mentioned means for passing a non erosive fluid on said piece after the flow of said erosive fluid has been stopped.

7. An apparatus according to claim 2 further including means operatively connected with said manometric means for ejecting said piece from said apparatus in response to the reduction of the pressure in said portion of said conduit to a predetermined value.

8. An apparatus according to claim 2 in which said erosive liquid is a corrosive one, said manometric means including an indicator liquid which is not corrosive, said second mentioned liquid being separate from the corrosive liquid which is caused to pass through said passage.

9. An apparatus according to claim 8 further including a third fluid interposed between said corrosive fluid and said non corrosive fluid, said third fluid being not attacked either by the corrosive fluid and by the non corrosive fluid and mixing with neither of these two fluids.

10. An apparatus according to claim 2 further including means for projecting a neutral fluid around the portion of said piece which is subjected to the action of said erosive liquid.

References Cited in the file of this patent

UNITED STATES PATENTS

| | | |
|---|---|---|
| 1,166,378 | Levy | Dec. 28, 1915 |
| 1,655,290 | Phelps et al. | Jan. 3, 1928 |
| 1,697,344 | Campbell | Jan. 1, 1929 |
| 1,850,133 | Munzinger | Mar. 22, 1932 |
| 1,875,819 | Naruse | Sept. 6, 1932 |
| 2,832,221 | Adams | Apr. 29, 1958 |
| 2,867,929 | Monahan | Jan. 13, 1959 |
| 2,895,814 | Clark | July 21, 1959 |
| 2,933,675 | Hoelzle | Apr. 19, 1960 |

FOREIGN PATENTS

| | | |
|---|---|---|
| 343,557 | Italy | Oct. 2, 1936 |